United States Patent
Häupl

(10) Patent No.: US 12,202,682 B2
(45) Date of Patent: Jan. 21, 2025

(54) DEVICE FOR SORTING TRUNKS

(71) Applicant: Friedrich Häupl, St. Georgen im Attergau (AT)

(72) Inventor: Friedrich Häupl, St. Georgen im Attergau (AT)

( * ) Notice: Subject to any disclaimer, the term of this patent is extended or adjusted under 35 U.S.C. 154(b) by 113 days.

(21) Appl. No.: 17/796,993

(22) PCT Filed: Feb. 4, 2021

(86) PCT No.: PCT/AT2021/060041
§ 371 (c)(1),
(2) Date: Aug. 2, 2022

(87) PCT Pub. No.: WO2021/159159
PCT Pub. Date: Aug. 19, 2021

(65) Prior Publication Data
US 2023/0059000 A1 Feb. 23, 2023

(30) Foreign Application Priority Data
Feb. 13, 2020 (AT) .............................. A 50111/2020

(51) Int. Cl.
*B65G 47/44* (2006.01)
*B07C 5/14* (2006.01)
(Continued)

(52) U.S. Cl.
CPC ................ *B65G 47/44* (2013.01); *B07C 5/14* (2013.01); *B65G 17/12* (2013.01); *B65G 47/82* (2013.01);
(Continued)

(58) Field of Classification Search
CPC ........ B65G 47/44; B65G 17/12; B65G 47/82; B65G 2203/0283; B65G 2201/0282; B07C 5/14; H02K 9/19; H02K 9/22
See application file for complete search history.

(56) References Cited

U.S. PATENT DOCUMENTS

| 3,581,891 A | * | 6/1971 | Rysti ...................... B65G 17/12 198/680 |
| 3,608,700 A | * | 9/1971 | Nilsson ................ B65G 17/323 198/794 |

(Continued)

FOREIGN PATENT DOCUMENTS

| AT | 343540 | 9/1977 |
| CN | 206871982 U | * 1/2018 |

(Continued)

OTHER PUBLICATIONS

Espacenet Abstract for DE 30 24 699 A, Jan. 21, 1982.
(Continued)

*Primary Examiner* — Gene O Crawford
*Assistant Examiner* — Abby A Jorgensen
(74) *Attorney, Agent, or Firm* — Tiajoloff & Kelly LLP

(57) ABSTRACT

A device for sorting trunks, in particular logs, comprises a conveyor device, which has carriers, and ejectors, which are arranged along the conveyor device, for a controlled discharge from the conveyor device into log magazines according to signals from a superordinate controller. A common rotary drive is connected with each set of at least two ejector pairs, which are drivingly connected together by means of an axle. The rotary drive is a torque motor, the rotor of which is rigidly connected directly to the axle and the stator of which is rotationally fixed relative to the conveyor device.

18 Claims, 4 Drawing Sheets

Figure 1:
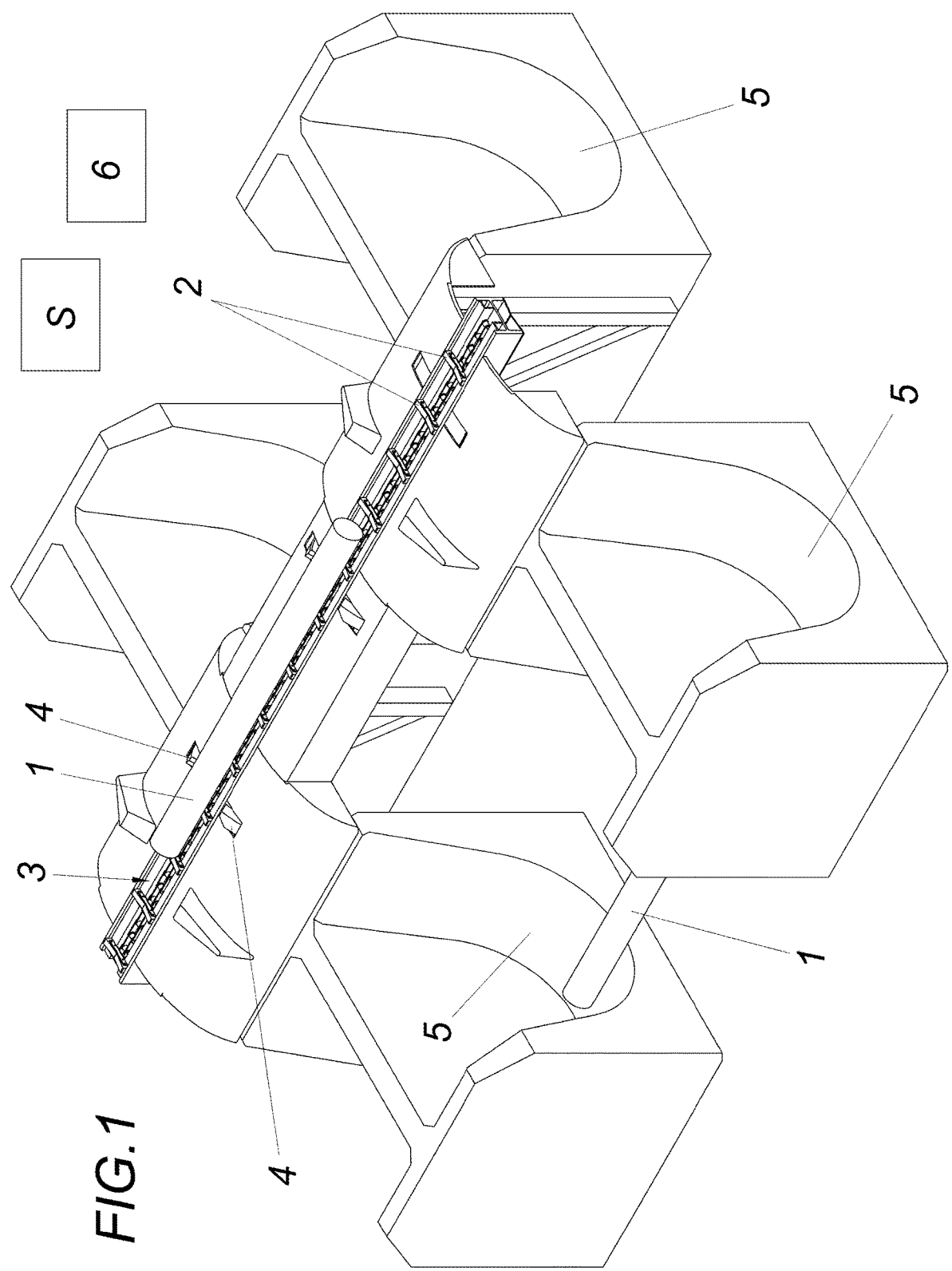

(51) Int. Cl.
*B65G 17/12* (2006.01)
*B65G 47/82* (2006.01)
*H02K 9/19* (2006.01)
*H02K 9/22* (2006.01)

(52) U.S. Cl.
CPC ............... *H02K 9/19* (2013.01); *H02K 9/22* (2013.01); *B65G 2203/0283* (2013.01)

(56) References Cited

U.S. PATENT DOCUMENTS

| | | | | |
|---|---|---|---|---|
| 6,155,720 A | * | 12/2000 | Battig | ............... F16C 17/02 384/99 |
| 2009/0284104 A1 | | 11/2009 | Knorr et al. | |
| 2010/0116721 A1 | * | 5/2010 | Henderson | ............ B65G 47/82 209/517 |
| 2015/0259145 A1 | * | 9/2015 | Fenile | ............... B65G 47/61 198/803.3 |

FOREIGN PATENT DOCUMENTS

| | | | | |
|---|---|---|---|---|
| CN | 209109632 U | * | 7/2019 | |
| CN | 209109632 U2 | | 7/2019 | |
| DE | 1756753 A1 | | 8/1970 | |
| DE | 2014857 A | | 3/1971 | |
| DE | 3024699 A1 | | 1/1982 | |
| DE | 4329185 A1 | | 3/1995 | |
| DE | 102006015065 A1 | * | 10/2007 | ............ H02K 11/21 |
| DE | 102013203242 A1 | | 8/2014 | |
| EP | 1790599 A1 | * | 5/2007 | ........... B65H 16/103 |
| GB | 529543 A | * | 11/1940 | |

OTHER PUBLICATIONS

Espacenet Abstract for DE 4329185 A, Mar. 2, 1995.
Espacenet Abstract for DE 102013203242 A, Aug. 28, 2014.
Espacenet Abstract for EP 1790599 A1, May 30, 2007.

* cited by examiner

DEVICE FOR SORTING TRUNKS

FIELD OF THE INVENTION

The invention relates to a device for sorting trunks, in particular logs, comprising a conveyor device having carriers and ejectors arranged along the conveyor device for the controlled discharge of the trunks from the conveyor device into log magazines according to signals from a superordinate controller, wherein a common rotary drive is associated with each of at least two pairs of ejectors which are drive-connected to one another by means of an axle.

DESCRIPTION OF THE PRIOR ART

For the sorting of e.g. logs in sawmills, a longitudinal transport of the logs on a conveyor device, namely a conveyor chain, with carriers and with so-called W-shaped ejectors arranged below the forward run and above the return run of the conveyor chain, which are arranged at positions provided for this purpose along the conveyor device, has become established in the last decades, which ensure that the logs are ejected from the conveyor chain, which are subsequently sorted and temporarily stored in corresponding log magazines. Such a W-shaped ejector forms an ejector pair. With, for example, two of these pairs of ejectors spaced apart in the conveying direction, the trunks, as viewed in the conveying direction of the conveyor, can be discharged equally to the left and to the right into log magazines, wherein at least two pairs of ejectors, which are drive-connected to one another by means of a shaft, are each assigned to one discharge zone. A pair of ejectors consists of two curved ejector legs which are connected to one another at one end and which are mounted in the connecting region so as to be jointly pivotably adjustable about an axis parallel to the conveying direction, wherein the two curved ejector legs are designed in such a way that, when the shaft is pivoted by the rotary drive, they can alternately engage around the forward run of the conveyor device in such a way that a trunk is ejected from the conveyor device either to the right or to the left.

Due to the increased worldwide use of this technology and the performance increases associated with the principles of rationalization and cost reduction, weak points and limitations have been revealed in the mechanical and electrical solutions used to date. These have been eliminated by the present invention, which also creates the possibility of further performance increases coupled with trouble-free operation and better process quality, energy savings and $CO_2$ emission reductions.

A known device for sorting trunks with a laterally tiltable conveyor device, which has carriers moved along slideways by traction means, is known from DE 2 014 857 A. In this solution, the carriers are tilted at the discharge point, for which purpose the slideways are assigned run-up cam pieces with which the path of movement of the carriers can be displaced from a conveying plane into an discharge position raised on one side from the conveying plane, wherein the run-up cam pieces are controlled as a function of a measuring device for dimensions of the objects to be sorted. DE 30 24 699 A1 discloses another device in which the carriers are designed as carriages rolling on the guideway with a log support block which can be tilted at the predetermined point for the purpose of ejecting the carried log.

The following has proven to be disadvantageous with known devices. There is often an inaccurate discharge of the trunks. Since the usual, conventional rotary drive of the ejectors is by means of a motor gearbox and coupling, there is an unavoidable and also necessary play in the interaction of these components. In connection with the given moments of inertia and braking, an exact electrical or electronic signal given by a control program cannot be converted into an equally exact movement of the ejectors, so that imprecise and scattered discharge is inherent in the system. Due to the unstable chain run laterally to the direction of pull, unintentional falling of trunks from the conveyor may occur, resulting in limited operating speed and performance of the device.

A possible conveying speed of the conveyor device is, for example, 3 meters per sec [m/s]. Ejectors must achieve centrifugal speeds of 2.2 [m/s] in known installations. Play in the drive train of the torque-transmitting components causes a dispersion of the ejector impact time of the order of 0.1 s, which can lead to disordered discharge of the trunks. Because the early or late discharge not only leads to an equally displaced discharge into the log magazines, but also causes an angular momentum about a vertical axis, which can result in a disorderly deposition of the trunks in the magazine compartments and thus in a jamming of the magazine compartments. A regular discharge with the tolerance of +/−5 cm is therefore important for a removal of the trunks with an excavator from the log magazine, because the ordered content of the box is the prerequisite for a trouble-free removal and stacking up to a height of 10 meters on the opposite stock pile. Especially for a desired fully autonomous operation of a floor conveyor.

From DE 102013203242 A1, devices for handling objects are known which serve to generate a defined, type- or size-dependent arrangement of objects, in particular piece goods, in a plane. These are grouping devices for generating group arrangements of certain geometrically shaped objects, for example in the field of the beverage industry, where a certain number of filled beverage containers are combined into packs for packaging. In principle, such equipment is used wherever objects with defined dimensions and shapes are prepared or produced and then packaged and grouped for transport or shipping.

SUMMARY OF THE INVENTION

The invention is thus based on the object of creating a device of the type described at the outset, with which the discharge accuracy of trunks from a conveyor device into log magazines and the availability of the plant itself is improved.

The invention solves the problem posed in that the rotary drive is a torque motor, the rotor of which is directly rigidly connected to the axle and the stator of which is arranged in a rotationally fixed manner relative to the conveyor device.

This achieves an incomparably better work result at a higher sorting speed. Due to the zero torsional tolerance in the drive train, the discharge accuracy of trunks from a conveyor into log magazines can be significantly improved. In particular, with a higher availability of the plant itself, the subsequent work process with floor conveyors is significantly facilitated, since the trunks can be deposited in the magazines without errors.

A torque motor is a high-pole, direct electric drive from the group of low-speed motors. Torque motors have very high torques at relatively low speeds. Special forms are, for example, pivot motors that do not perform a 360° rotation. A torque motor can be regarded as a servomotor optimized for high torques and can be designed as an external or internal rotor. The high drive torque enables high accelerations and permits high drive stiffness, since there is no backlash in the drive train of the ejector according to the invention.

In order to be able to precisely control the torque motor and thus specify a desired swing-out angle of the ejectors as well as a safe return, it is advisable for it to be equipped with a rotation angle sensor that measures the rotation angle between the rotor and stator in order to determine the rotor rotation position. Due to the operating principle of the torque motor, a device according to the invention does not require a mechanical brake subject to wear, which is replaced by the system's own standstill or braking torque of the torque motor in the event of pole reversal of sufficient magnitude. The zero position, which is important for accurate discharge, can be approached at any time with pinpoint accuracy and repeatability using the data from the position sensor. Preferably, the trunks are ejected from the conveyor device by the ejectors without angular momentum, i.e., without imparting angular momentum about the trunk axis. This is to be ensured in particular by the omission of toothed bars in the discharge zone, so that no angular momentum is imparted to the log as it slips into the magazine.

For the purpose of determining an exact release time for the rotary drive and thus the ejector, at least one position sensor can be associated with the conveyor device for determining a master position on the conveyor device.

It is of particular advantage if the interior of a housing of the torque motor is filled with a fluid, in particular a transformer oil, for lubrication and temperature control and if the housing is optionally equipped with cooling fins for cooling. This creates a device that is easy to temper, has particularly few moving parts and is easy to maintain.

Particularly robust and space-saving conditions result for the conveyor device if it comprises a horizontal I-beam with a connecting web connecting two belts and a conveyor chain carrying the carriers, wherein the forward and return runs of the conveyor chain are arranged above the rotary drive. However, a conveyor device of this design is not limited to use with the rotary drive of the invention. However, in connection with the invention, a particularly compact design with low overall height is obtained. This conveyor device creates the necessary space for optimum positioning of the ejector device with ejectors, rotary drive and axle and its freely accessible assembly and maintenance possibility.

If the forward and return runs of the conveyor chain are guided in a space spanned by the belts, with the forward run being guided on one side in a forward run space and the return run on the other side of the connecting web in a return run space, this also results in particularly robust and weight-saving design conditions with a small conveyor cross-section, since all forces can be dissipated by the I-beam. By using a horizontal I-beam as the support for the entire conveyor device, it is possible to easily produce a forward and return run in a very confined space with the most accurate guidance of the carriers in an impact- and load-resistant form using inexpensive means.

In this case, the forward run space at the side of the conveyor chain can be equipped with guide rails for the profiles forming the carriers. The conveyor chain extends between the profiles and the carriers run or slide on the profiles. The profiles and/or the belts also optionally provide lateral guidance for the carriers, which considerably improves the smooth running of the conveyor device.

The return run space can be closed off with a sliding guide for the carriers arranged between the belts, with the carriers running on the sliding guide, thus avoiding sagging of the return run.

Particularly simple design conditions are obtained when the ejectors with the rotary drive are arranged on the conveyor device, wherein in particular at one end of the axle the torque motor is attached to the conveyor device with a fixed bearing and at the other end of the axle a bearing block with a floating bearing. Preferably, the rotor of the torque motor is flanged directly to the undiminished torsional cross-section of the axle on the drive side and thus connected robustly and without tolerances, whereby the magnetic rotary motion can be converted into the discharge pulse without play. The motor-side bearing of the rotor and thus of the axle is provided by a journal bearing, which is arranged between a journal fixed to the housing and a bearing seat on the inner circumference of the rotor body.

BRIEF DESCRIPTION OF THE INVENTION

Figure 2:
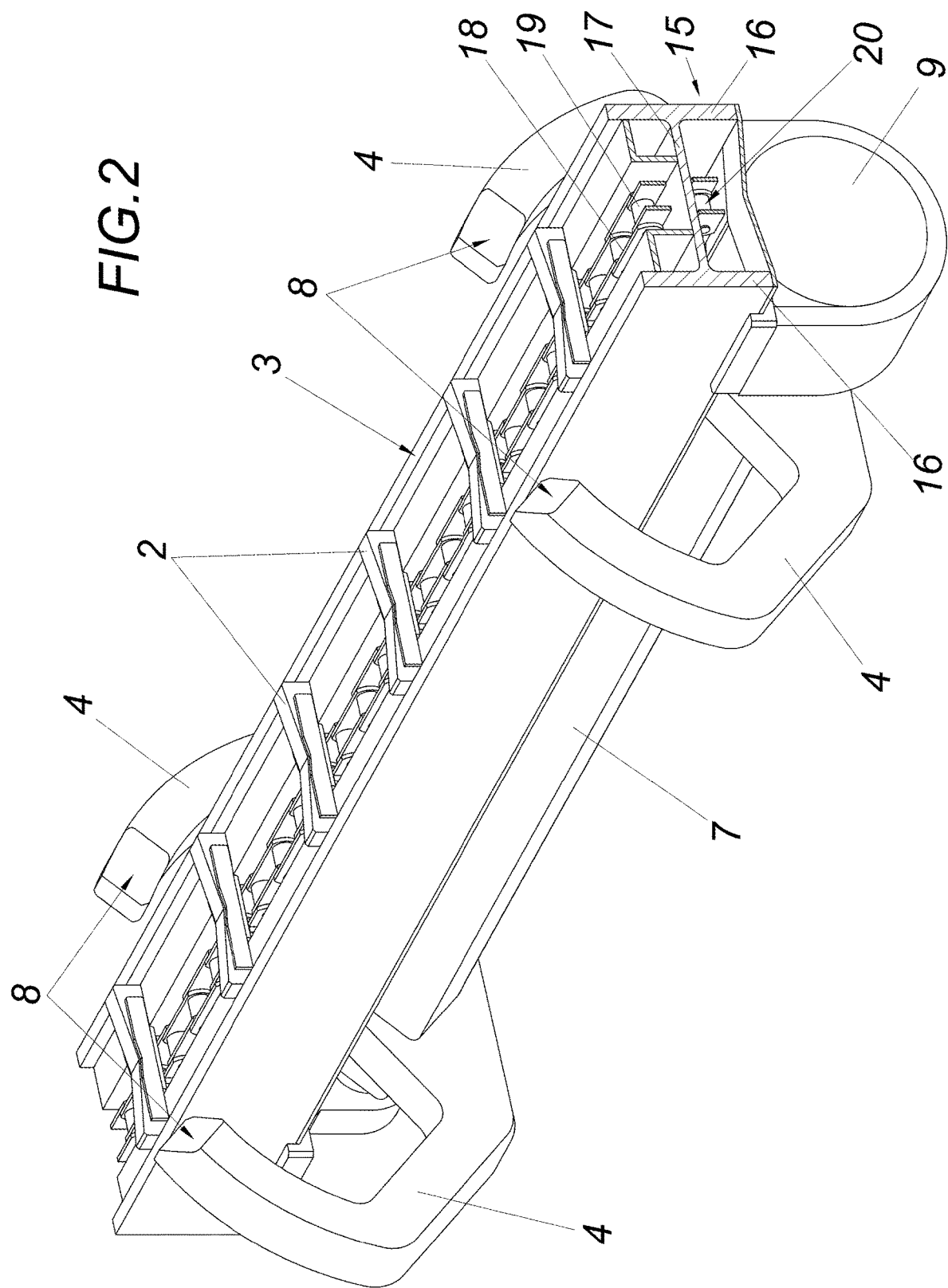
Figure 3:
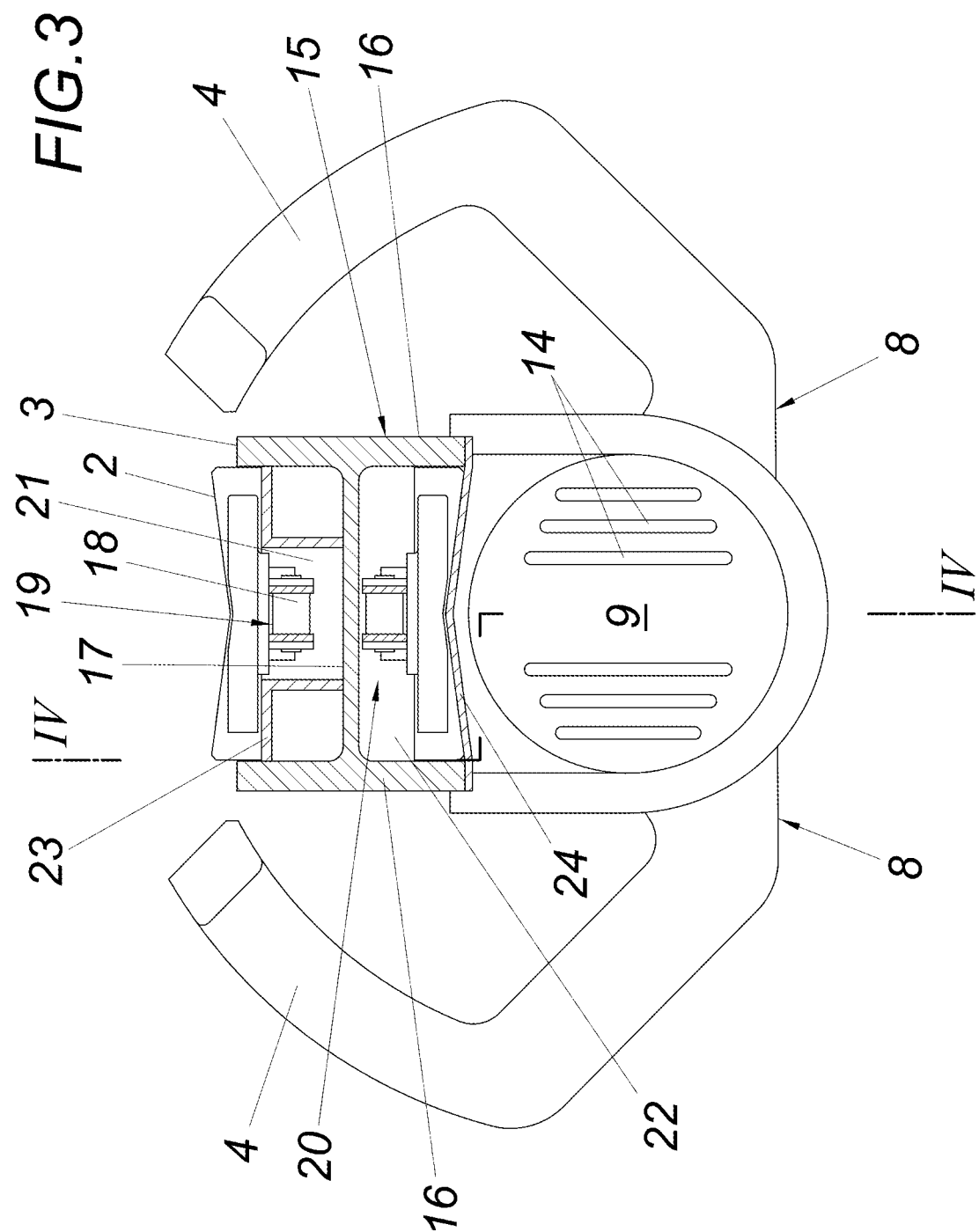
Figure 4:
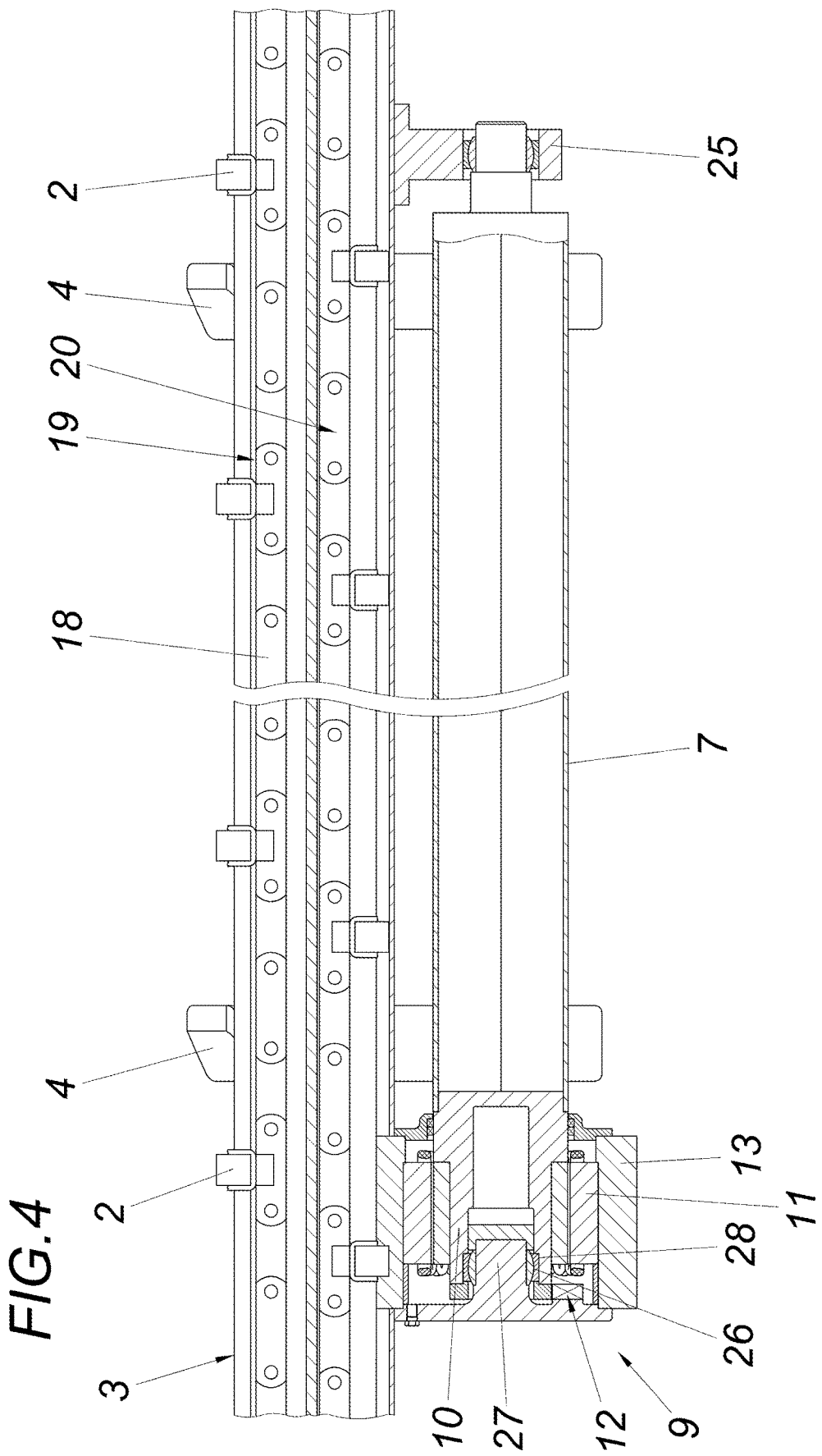

In the drawing, the subject matter of the invention is shown by way of example, wherein:

FIG. 1 shows an oblique view of a conveyor section of a device according to the invention, FIG. 2 shows an enlarged part of the conveyor device from FIG. 1 in oblique view with the discharge guides removed, FIG. 3 shows a device according to the invention in cross-section, and FIG. 4 shows the device in longitudinal section according to line IV-IV from FIG. 3.

DETAILED DESCRIPTION OF THE PREFERRED EMBODIMENTS

The device according to the invention for sorting trunks 1, in particular round logs, has, among other things, a conveyor device 3 having carriers 2 and ejectors 4 arranged along the conveyor device 3 for the targeted discharge of trunks 1 from the conveyor device 3 into log magazines 5. The discharge into the log magazines 5 takes place in dependence on signals of a superordinate controller 6, wherein a common rotary drive 9 belongs to each of at least two ejector pairs 8, which are drive-connected with one another by means of an axle 7.

The rotary drive 9 is a torque motor whose rotor 10 is rigidly connected directly to the axle 7 and whose stator 11 is arranged in a rotationally fixed manner with respect to the conveyor device 3. In particular, the rotor 10 is shrunk directly onto an axle stub of the axle 7 without play, i.e. rigidly and directly, and is mounted in a housing 13 which accommodates the stator 11. This eliminates all possible sources of inaccuracy and creates a highly dynamic and accurate system that meets the requirements of precise, repeatable discharge and enables high-speed sorting, while its simplicity also ensures a long service life and low maintenance coupled with trouble-free operation.

To determine the rotor position, the torque motor is equipped with a rotation angle sensor 12 which measures the angle of rotation between the rotor 10 and the stator 11. The interior of a housing 13 of the torque motor is filled with a fluid, in particular a transformer oil, for lubrication and temperature control. In addition, the housing 13 is equipped with cooling fins 14 for cooling.

To determine a trunk position on the conveyor device 3, at least one position sensor S indicated in the drawing is associated with the conveyor device 3, which is to be positioned at a suitable location. Usually, such a position sensor S, for example a light barrier, will be provided in the area of the beginning of the conveyor device in front of the discharge zones.

The conveyor device 3 comprises a horizontal I-beam 15 with a connecting web 17 connecting two belts 16 and a conveyor chain 18 carrying the carriers 2, wherein the forward run 19 and return run 20 of the conveyor chain 18 are arranged above the rotary drive 9.

The forward run 19 and the return run 20 of the conveyor chain 18 are guided in a space spanned by the belts 16, wherein the forward run 19 is guided on one side in a forward run space 21 and the return run 20 is guided on the other side of the connecting web 17 in a return run space 22. The forward run space 21 is equipped at the side of the conveyor chain 18 with guide rails for the profiles 23 forming the carriers 2. The guide rails are angle profiles attached at one end to a belt and at the other end to the web. The return run space 22 is closed off by a sliding guide 24 for the carriers 2 arranged between the belts 16. The sliding guide 24 is formed by a ridge-like sheet metal profile which is attached to the edges of the belts and projects into the return run space 22.

The ejectors 4 are mounted with the rotary drive 9 on the conveyor device 3, in the exemplary embodiment on the I-beam 15, wherein the torque motor is attached to the conveyor device 3 at one end of the axle 7 and a bearing block 25, in which the axle 7 is mounted, is attached at the other end of the axle 7. The torque motor and the axle 7 thus form an assembly which jointly absorbs transverse forces and is mounted at one end in the housing 13 and at the other end in the bearing block 25. As can be seen from FIG. 4, the rotor 10 of the torque motor is flanged directly to the undiminished torsional cross-section of the axle 7 on the drive side, so that there is no weakening of the rotary drive due to cross-section reduction in the drive train. The bearing arrangement on the motor side of the rotor 10 and thus of the axle 7 is provided by a journal bearing 26, which is arranged between a journal 27 fixed to the housing and a bearing receptacle 28 on the rotor inner circumference side of the rotor 10.

The trunks are measured by a log preparation system upstream of the device according to the invention, which is not shown in the drawing, and the log magazine 5 in which a trunk 1 is to be deposited is determined as a function of the measurement results. Thus, a discharge address is determined for each trunk.

In addition, the discharge time is calculated to an accuracy of $\frac{1}{1000}s$ depending on the conveying speed or path position of the trunks, thus ensuring functionally correct and repeatable discharge into the respective log magazine 5. The exact discharge is ensured by the ejector 4 and the rotary drive 9 of the invention, which executes an exact pivoting movement at the right time, with the right speed and the right size (approx. 45° pivoting movement) and is then shifted back to the zero position within a permitted time window.

The invention claimed is:

1. A device for sorting trunks, said device comprising
a conveyor device having carriers and ejectors arranged along the conveyor device and providing a controlled discharge of the trunks from the conveyor device into log magazines responsive to signals from a superordinate controller;
at least two pairs of the ejectors each being operatively associated with a common rotary drive, the pairs of ejectors being drive-connected to one another by an axle;
wherein the rotary drive is a torque motor having
a rotor that is directly rigidly connected to the axle and
a stator that is supported in a rotationally fixed manner with respect to a housing of the conveyor device;
wherein the ejectors associated with the rotary drive are supported on the conveyor device;
wherein the axle has two opposite ends, and the torque motor is fixedly connected to the conveyor device at one of the ends of the axle, and a bearing block is fixedly connected to the conveyor device at the other end of the axle; and
wherein the rotor of the torque motor has a drive side that is fixedly connected to the axle without reduction in cross section of the axle so as to transmit torque from the rotor to the axle and cause rotation thereof about an axis; and
wherein the rotor has a motor-side bearing supporting the rotor and the axle, said motor-side bearing having a journal bearing supported between a journal fixedly connected to the housing and a bearing receptacle on an inner circumference side of the rotor; and
wherein the axle has a connection to the rotor that transmits transverse loads on the axle that are transverse to the axis of the axle to the rotor, and through the rotor to the motor-side bearing, and to the journal such that the transverse loads are supported on the journal.

2. The device according to claim 1, wherein a rotation angle sensor measuring a rotation angle between the rotor and the stator is associated with the torque motor and determines a rotation position of the rotor.

3. The device according to claim 1, wherein an interior of the housing of the torque motor is filled with an electrically insulating fluid providing lubrication and heat dissipation.

4. The device according to claim 3, wherein the housing has cooling fins cooling the torque motor.

5. A device for sorting trunks, said device comprising
a conveyor device having carriers and ejectors arranged along the conveyor device and providing a controlled discharge of the trunks from the conveyor device into log magazines responsive to signals from a superordinate controller;
at least two pairs of the ejectors each being operatively associated with a common rotary drive, the pairs of ejectors being drive-connected to one another by an axle;
wherein the rotary drive is a torque motor having
a rotor that is directly rigidly connected to the axle and
a stator that is supported in a rotationally fixed manner with respect to the conveyor device;
wherein the ejectors associated with the rotary drive are supported on the conveyor device;
wherein the axle has two opposite ends, and the torque motor is fixedly connected to the conveyor device at one of the ends of the axle, and a bearing block is fixedly connected to the conveyor device at the other end of the axle; and
wherein the rotor of the torque motor is flanged directly to a undiminished torsional cross-section of the axle on a drive side of said rotor; and
wherein the rotor has a motor-side bearing supporting the rotor and the axle, said motor-side bearing having a journal bearing supported between a journal fixedly connected to a housing and a bearing receptacle on an inner circumference side of the rotor; and
wherein the conveyor device comprises a horizontal I-beam with a connecting web connecting two belts and a conveyor chain carrying the carriers, and wherein the conveyor chain has a forward run and a return run arranged above the rotary drive.

6. The device according to claim 5, wherein the forward run and return run of the conveyor chain are guided in a space spanned by the belts, and wherein the forward run is guided on one side of the connecting web in a forward run space and the return run is guided on the other side of the connecting web in a return run space.

7. The device according to claim 6, wherein the forward run space is provided laterally of the conveyor chain with guide rails for profiles forming the carriers.

8. The device according to claim 6, wherein the return run space is closed off with a sliding guide for the carriers supported between the belts.

9. The device according to claim 2, wherein an interior of the housing of the torque motor is filled with an electrically insulating fluid providing lubrication and heat dissipation.

10. The device according to claim 9, wherein the housing has cooling fins cooling the torque motor.

11. The device according to claim 5, wherein a rotation angle sensor measuring a rotation angle between the rotor and the stator is associated with the torque motor and determines a rotation position of the rotor.

12. The device according to claim 5, wherein an interior of the housing of the torque motor is filled with an electrically insulating fluid providing lubrication and heat dissipation.

13. The device according to claim 12, wherein the housing has cooling fins cooling the torque motor.

14. A device for sorting trunks, said device comprising
a conveyor device supporting an axle thereon rotatable about an axis;
said axle supporting carriers and a pairs of ejectors that provide a controlled discharge of the trunks from the conveyor device into log magazines responsive to signals from a controller;
wherein the axle has first and second opposite ends;
the first end of the axle being supported by a bearing block that is fixedly connected to the conveyor device and supports the axle for rotation about said axis; and
the second end of the axle being connected to a rotary drive that selectively causes rotation of the axle;
wherein the rotary drive comprises a torque motor having a stator that is fixedly supported with respect to the conveyor device, and a rotor that is rotated by the stator;
a journal being fixedly supported on the conveyor device;
said rotor having a journal bearing in a bearing receptacle on an inner circumference side of the rotor, said journal bearing supporting the rotor on the journal for rotation of the rotor about said axis;
wherein the axle has a connection fixedly connecting the axle to the rotor, said connection transmitting torque from the rotor of the torque motor to the axle so as to cause rotation thereof about the axis and transmitting transverse loads on the axle transverse to the axis to the rotor, and through the rotor to the journal bearing, and to the journal such that the journal supports transverse loads in the axle.

15. The device according to claim 14, wherein the axle has a tubular configuration that is constant in diameter and in cross section at the second end of the axle, and the tubular configuration end of the axle is flanged fixedly over a cylindrical drive portion of the rotor so that the connection has undiminished cross-sectional area bearing torsional loads to the axle.

16. The device according to claim 14, wherein a rotation angle sensor measuring a rotation angle between the rotor and the stator is associated with the torque motor and determines a rotation position of the rotor.

17. The device according to claim 14, wherein a housing supported on the conveyor device houses the torque motor, said housing having an interior filled with an electrically insulating fluid providing lubrication and heat dissipation.

18. The device according to claim 17, wherein the housing has cooling fins cooling the torque motor.

* * * * *